(No Model.)
W. E. MITCHELL.
RUNNER ATTACHMENT FOR VEHICLE WHEELS.
No. 505,668. Patented Sept. 26, 1893.
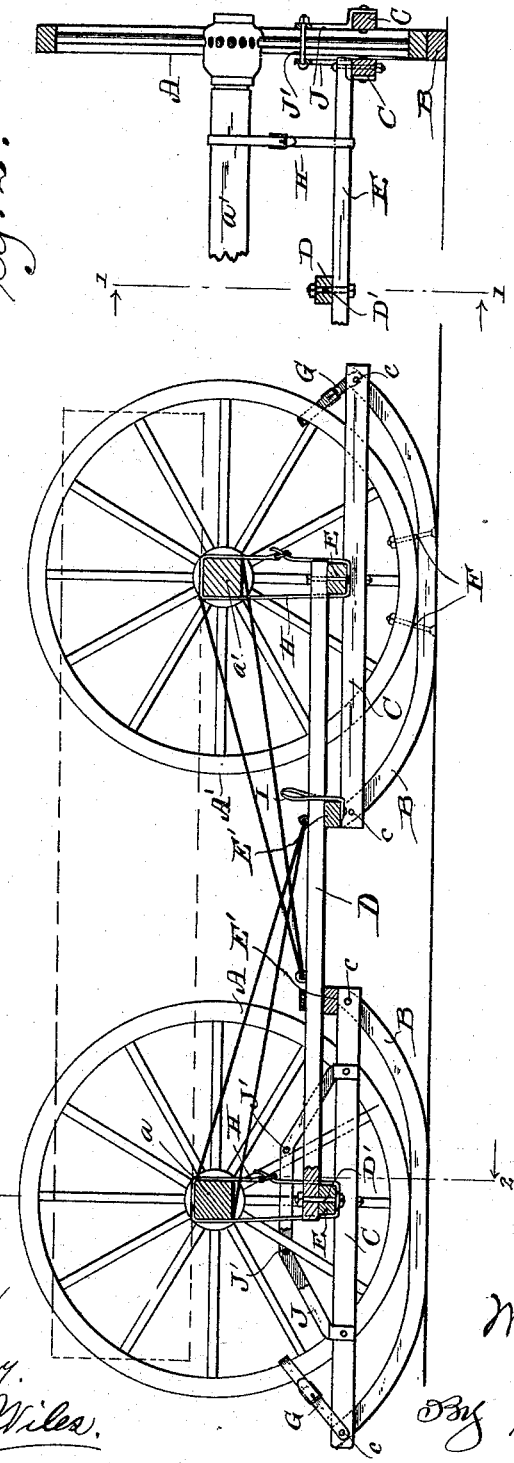
Witnesses
Geo. W. Young
John E. Wiles
Inventor
William E. Mitchell
By H. G. Underwood
Attorney

UNITED STATES PATENT OFFICE.

WILLIAM E. MITCHELL, OF MERTON, WISCONSIN.

RUNNER ATTACHMENT FOR VEHICLE-WHEELS.

SPECIFICATION forming part of Letters Patent No. 505,668, dated September 26, 1893.

Application filed February 7, 1893. Serial No. 461,300. (No model.)

*To all whom it may concern:*

Be it known that I, WILLIAM E. MITCHELL, a citizen of the United States, and a resident of Merton, in the county of Waukesha, and in the State of Wisconsin, have invented certain new and useful Improvements in Runner Attachments for Vehicle-Wheels; and I do hereby declare that the following is a full, clear, and exact description thereof.

My invention relates to new and useful improvements in sled runner attachments for vehicle wheels, and consists in the matters hereinafter described and pointed out in the appended claim.

In the accompanying drawings illustrating my invention: Figure 1 is a vertical longitudinal central sectional view taken on line 1—1 of Fig. 2. Fig. 2 is a vertical transverse sectional view taken on line 2—2 of Fig. 1.

In said drawings, A A' represent respectively the wheels of the front and the rear trucks of a vehicle and $a$ $a'$ respectively, the axles of said trucks. Suitable runners are secured to the under sides of the wheels, said runners being conveniently composed of curved shoes B B, and longitudinal bars C C secured as at $c$ $c$ to opposite sides of the upturned ends of the curved shoes B B, as shown. A reach D extends centrally from the front to the rear truck, and is suitably engaged therewith in any convenient manner, as by means of the transverse bars E E, to the front one of which, said reach is pivotally secured as at D', so as to permit the front truck to turn in the ordinary manner. Transverse bars E' E' are also secured respectively to the rear ends of the runners of the front truck, and the front ends of the runners of the rear truck as shown. The shoes B B are conveniently made of the same width as the tires of the wheels, and the longitudinal bars C C, secured thereto are arranged to embrace the lower part of the wheel as shown more particularly in Fig. 2 of the drawings.

The runners may be secured to the wheels in any desired manner, but I have illustrated two methods of securing said runners to the wheels, in the drawings which I will now proceed to describe.

As shown at the right hand part of Fig. 1, the runners may be secured to the rims of the wheels by means of suitable bolts F F, passed upwardly through the shoes B B and the rims of the wheels, and further secured by suitable straps G secured to the ends of the runners and passed around the rims of the wheels. I also prefer to pass a strap H around the axle of the truck and the transverse bar E, adjacent to each wheel. The forward end of the rear truck is also loosely secured to the reach by means of a strap I, which permits of a slight rocking movement of the runners with respect to said reach.

As shown at the left hand part of Fig. 1 the runners are secured to the wheels by means of suitable upwardly extending brackets J J which are secured to the upper sides of the longitudinal bars C C, and are arranged to embrace the spokes of the wheels, and suitable bolts J' J' passed through said brackets adjacent to the spokes of the wheels, so as to prevent any movement of the runners with respect to the wheels. A strap H is passed around the axle and the transverse bar E, as in the form first described, adjacent to each wheel, and straps G are secured to the ends of the runners and are passed around the rims of the wheels, as before.

My improved runners may be very readily secured to the wheels of the vehicle and as easily detached therefrom when desired.

My improved device is at once simple in construction, strong, and durable, and applicable to the wheels of any kind of vehicle.

Having thus described my invention, what I claim as new, and desire to secure by Letters Patent, is—

The combination with the front and rear pairs of wheels of a vehicle of runners secured to said wheels, transverse bars extending between the runners of each pair, a reach extending longitudinally between said transverse bars and pivotally secured to the front one of the same, and straps connecting the said transverse bars with the axles of the respective pairs of wheels, substantially as set forth.

In testimony that I claim the foregoing I have hereunto set my hand, at Milwaukee, in the county of Milwaukee and State of Wisconsin, in the presence of two witnesses.

WILLIAM E. MITCHELL.

Witnesses:
 JOHN E. WILES,
 C. W. SCOTT.